(12) United States Patent
Yagi et al.

(10) Patent No.: US 6,897,990 B2
(45) Date of Patent: May 24, 2005

(54) ROCKING MEMBER APPARATUS

(75) Inventors: Takayuki Yagi, Kanagawa (JP); Masahiro Kawase, Saitama (JP); Naoki Saito, Gunma (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/329,383

(22) Filed: Dec. 27, 2002

(65) Prior Publication Data

US 2003/0137711 A1 Jul. 24, 2003

(30) Foreign Application Priority Data

Dec. 28, 2001 (JP) ........................................ 2001-399028

(51) Int. Cl.⁷ ............................................. G02B 26/08
(52) U.S. Cl. ................................................... 359/224
(58) Field of Search ........................ 359/224, 197–199, 359/212, 223, 225, 226

(56) References Cited

U.S. PATENT DOCUMENTS 5,606,447 A * 2/1997 Asada et al. ................ 359/199

6,198,565 B1 * 3/2001 Iseki et al. .................. 359/224

FOREIGN PATENT DOCUMENTS

JP    6-82711    3/1994

* cited by examiner

Primary Examiner—Euncha P. Cherry
(74) Attorney, Agent, or Firm—Fitzpatrick, Cella, Harper & Scinto

(57) ABSTRACT

Provided is a rocking member apparatus comprising torsion springs, a rocking member axially supported by the torsion spring, and a supporting substrate, the rocking member being rockable about the torsion spring, wherein a hard magnetic member is provided on one surface of the rocking member, a coil and a soft magnetic member, which are arranged so as to be spaced apart from the rocking member, the coil and the soft magnetic member are arranged at different positions in a direction vertical to the one surface, and the hard magnetic member is arranged at a position which is the same position as the soft magnetic member and the one surface in a direction vertical thereto, or a position which is on the side where the coil is arranged as seen from the soft magnetic member, whereby the apparatus can be made small and lightweight and allows increased deflection angle, high-speed scanning, and reduced power consumption.

10 Claims, 11 Drawing Sheets

FIG. 10A
FIG. 10C
FIG. 10B
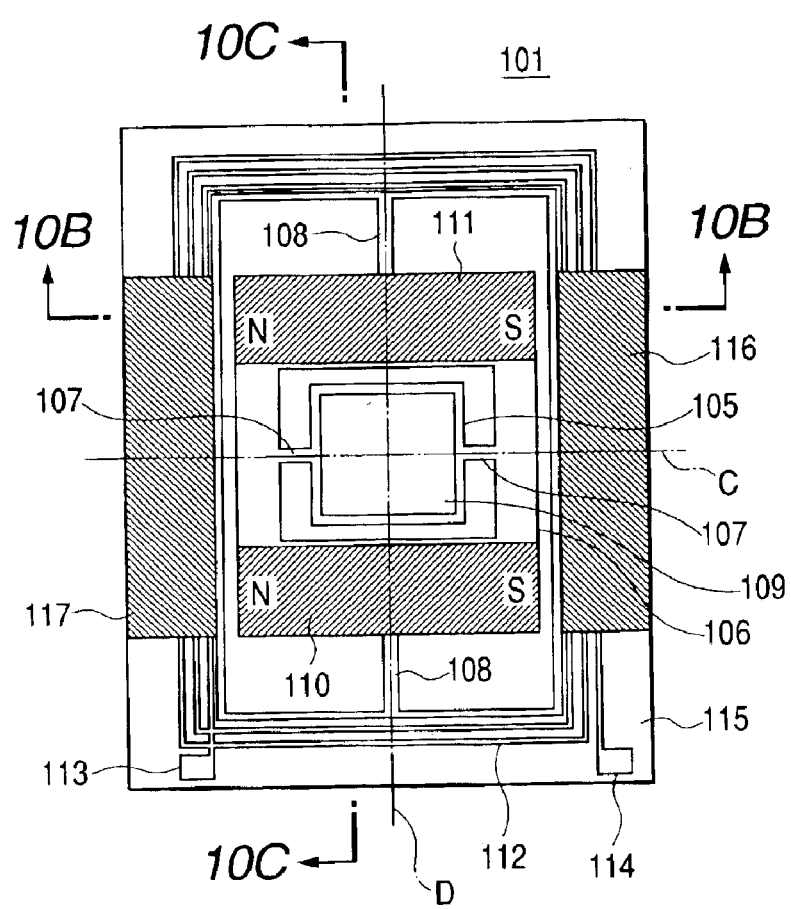
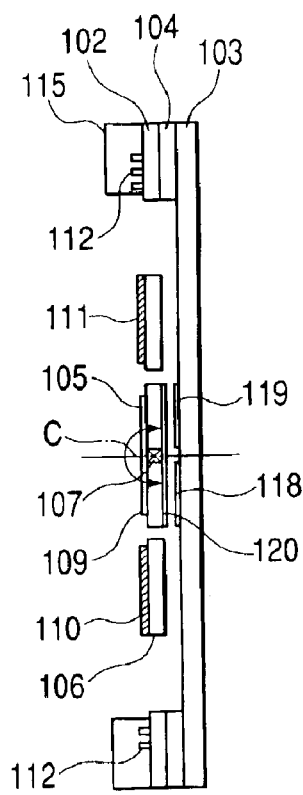
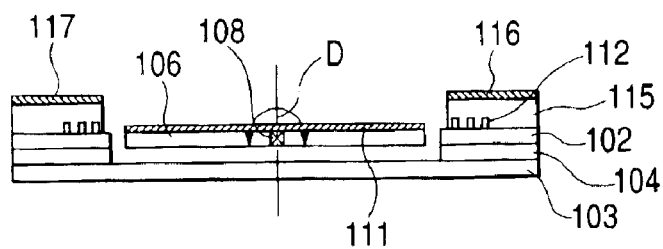

PRIOR ART

PRIOR ART

ROCKING MEMBER APPARATUS

BACKGROUND OF THE INVENTION

1. Field of the Invention

The present invention relates to a rocking member apparatus having a rocking member that is rockable about an axis. Specifically, the invention relates to an optical deflector in which a rocking member for deflecting incident light is rocked by utilizing electromagnetic force, and to an image display apparatus incorporating the optical deflector.

2. Related Background Art

Devices for deflecting/scanning light beams such as laser light (such devices are referred to as the "optical deflectors" in this specification) are currently used in optical equipment such as laser printers and bar-code readers. Conventional examples of optical deflectors to be incorporated in those equipment include polygon mirrors for changing the reflection direction of incident light by rotating a polygonal prism having mirror surfaces formed on its lateral faces, and galvano mirrors comprising a plane mirror that is rotationally vibrated by an electromagnetic actuator.

The following are required in the conventional mirrors described above. That is, the polygon mirrors require an electromagnetic motor for rotating the mirrors, and the galvano mirrors require a mechanical drive coil and a large yoke for generating a magnetic field. Further, the requirement of obtaining a high output torque limits miniaturization of those mechanical elements. Also, the spaces required for vertical stacking of the respective components and other factors contribute to limit overall size reduction of the apparatus for performing optical deflection.

It is a fundamental knowledge in electromagnetics that a torque is generated around a magnet placed under uniform magnetic fields. Assuming that m represents a magnetic moment (vector) of the magnet and H represents a magnetic field, a torque T (vector) is expressed as follows:

$$T = m \times H \quad (1)$$

A scanning mirror driving apparatus (refer to Japanese Patent Application Laid-Open No. 6-82711, for example) is an example of optical deflectors utilizing the above knowledge. FIGS. 16 to 18 illustrate such a scanning mirror driving apparatus as an optical deflector disclosed in Japanese Patent Application Laid-Open No. 6-82711. FIG. 16 is a perspective view showing Example 1 of the invention disclosed in the same document. The optical deflector includes a magnetism generating portion 1106 having a coil 1107 wound around a coil frame 1108, and a mirror portion 1101. The mirror portion 1101 includes a glass plate 1102, a mirror surface 1103, and a thin-film permanent magnet 1104, and is supported by a pair of supporting members 1105 so as to be rotatable about a rotation axis 1109 relative to a main body (not shown) of the apparatus. The thin-film permanent magnet 1104 is previously magnetized so as to have opposite polarities across the rotation axis 1109. The magnetism generating portion 1106 is disposed on the side of the permanent magnet 1104 of the mirror portion 1101, at a predetermined distance from the mirror portion 1101.

By supplying an electric current to the coil 1107, a magnetic field is generated from the magnetism generating portion 1106 whereby the mirror portion 1101 is rotated due to a torque exerted thereon in accordance with the aforementioned formula (1). Irradiating light onto the mirror surface 1103 at this time allows the light to be deflected/scanned.

FIG. 17 shows Example 2 of the invention disclosed in Patent Document 1. In the optical deflector disclosed therein, the magnetism generating portion 1106 having the coil 1107 wound around the coil frame 1108 is replaced by a magnetism generating portion 1116 having a coil 1117 and an iron core 1119. Other structural portions of the optical deflector are the same as those of Example 1 of the invention disclosed in the same document.

FIG. 18 illustrates Example 3 of the invention disclosed in Patent Document 1. The optical deflector disclosed therein is composed of a magnetism generating portion 1126 having a coil 1127 wound around a coil frame 1128, and a mirror portion 1121. The mirror portion 1121 includes a glass plate 1122, a mirror surface 1123, and a thin-film permanent magnet 1124, and is supported by a pair of supporting members 1125 so as to be rotatable about a rotation axis 1129 relative to the magnetism generating portion 1126. The thin-film permanent magnet 1124 is previously magnetized so as to have opposite polarities across the rotation axis 1129. The magnetism generating portion 1126 is coupled to an end portion of each of the supporting members 1125 and is arranged in the outer periphery of the mirror portion 1121.

The optical deflector disclosed in the cited Patent Document 1 is designed for use in a laser displacement sensor or the like for scanning and detecting minute surface irregularities or scars by utilizing interference of laser beams.

The present inventors have found that, with the optical deflector disclosed in the above document, it is difficult to sufficiently enlarge the deflection angle in the mirror portion, to cause high-speed rotation of the mirror portion, or to reduce power consumption.

In the optical deflector of the above document, in order to increase the rotational speed or to attain a large deflection angle (i.e. to increase the rotation angle of the mirror portion), it is required to increase the magnitude of a torque acting on the mirror portion. Further, for thus increasing the magnitude of the torque, it is required to increase the magnitude of a magnetic field at the mirror position. In that case, it is required that the magnetism generating portion be arranged in close proximity to the mirror portion or that a larger current be made to flow in the coil.

In the optical deflector of the above document which has a construction shown in FIG. 16, the coil is disposed underneath the mirror portion in close proximity thereto. In this case, bringing the magnetism generating portion into proximity of the mirror portion will result in unwanted contact between the mirror and the coil. Therefore, the mirror cannot make rocking movement over a wide angle.

Another problem with the above construction is that, as seen in the vertical direction of the coil (vertical direction with respect to the mirror surface), the lower part side of the coil is situated apart from the mirror portion and thus its contribution toward magnetic field generation is small. Such a construction is disadvantageous to generation of a torque, since the strength of a magnetic field is inversely proportional to the square of the distance between the mirror and the coil that surrounds it. In order to obtain a large torque with such a construction, it is necessary to cause a larger current to flow in the coil, which results in increased power consumption. Further, the vertical winding arrangement of the coil makes it difficult to achieve vertical miniaturization of the apparatus.

Further, the apparatus according to Example 2 of the invention disclosed in the above document is of a type in which the iron core 1118 is used to increase the strength of the magnetic field generated from an upper end portion of the coil. This apparatus also suffers from the problems in that vertical miniaturization cannot be attained and that the lower end portion of the coil makes only small contribution toward generation of the torque. Further, the iron core 1118 needs to have a large sectional area relative to the mirror 1111 opposing the iron core 1118.

Considering the large vertical thickness of the coil 1117, the above construction results in increased size of the apparatus, as well as increased weight due to the use of an iron core in order to increase the magnetic field strength.

The apparatus according to Example 3 of the invention disclosed in the above document, which is designed to achieve vertical miniaturization and lightweightness by winding the coil 1127 so as to surround the mirror 1121, is of a type in which no iron core is used. Also with this construction of the apparatus, upper and lower end portions of the vertically wound coil make only small contributions toward magnetic field generation.

Therefore, a large amount of power is required in order to incline the mirror 1121 by large angles.

Further, the present inventors have presumed that, in order to increase the scanning speed (rocking speed) of the mirror, it is necessary to increase hardness of the spring of the drive shaft. In this regard, however, the present inventors have found that increasing the hardness of the spring in the aforementioned optical deflector results in a further increase in power consumption, since, in the first place, the optical deflector has a large room for improvement in terms of its power consumption.

SUMMARY OF THE INVENTION

In view of the above-mentioned problems, it is an object of the present invention to provide a rocking member apparatus with low power consumption which allows a large torque to be generated to act on an axially supported rocking member, and an optical deflector and an image display apparatus which incorporate the rocking member apparatus.

Therefore, in accordance with the present invention, there is provided a rocking member apparatus comprising torsion springs, a rocking member axially supported by the torsion spring, and a supporting substrate, the rocking member being rockable about the torsion spring, wherein a hard magnetic member is provided on one surface of the rocking member;

a coil and a soft magnetic member, which are arranged so as to be spaced apart from the rocking member, the coil and the soft magnetic member are arranged at different positions in a direction vertical to the one surface; and the hard magnetic member is arranged at a position which is the same position as the soft magnetic member and the one surface in a direction vertical thereto, or a position which is on the side where the coil is arranged as seen from the soft magnetic member.

BRIEF DESCRIPTION OF THE DRAWINGS

FIGS. 10A, 10B and 10C are views for explaining a two-dimensional optical deflector according to Example 5 of the present invention.

DESCRIPTION OF THE PREFERRED EXAMPLES

Figure 1:
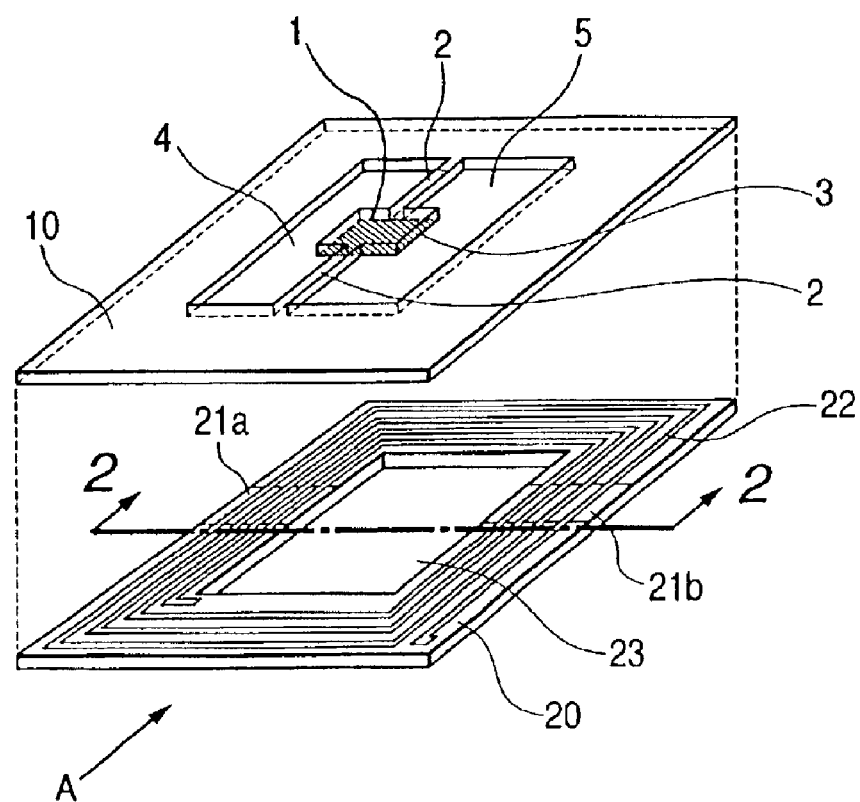
FIG. 1 is an exploded view showing Example 1 of the present invention.

The rocking member apparatus in accordance with this embodiment is a rocking member apparatus having a rocking member that is rotatable about a rotation axis. The rocking member is provided with a hard magnetic member having been magnetized in a direction orthogonal to (more specifically, a direction forming right angles with respect to) the direction of the rotation axis to be rendered a permanent magnet. Further, the apparatus includes magnetism generating means for generating magnetic flux lines. The apparatus further includes a soft magnetic member having an end arranged in proximity to the hard magnetic member so that the magnetic flux lines generated by the magnetism generating means can be effectively distributed near magnetic poles of the hard magnetic member attached onto the rocking member. The soft magnetic member and the magnetism generating means are arranged so as to be spaced apart from the rocking member and substantially integrated with each other.

According to the above-described construction of the apparatus, a large torque can be generated to act on the rocking member due to the soft magnetic member. Further, since the movable portion (rocking member) has no electrical wiring formed therein for generating a torque, there can be provided a rocking member apparatus such as an optical deflector which has a long life without fear of wire disconnection even as the rocking member continues its rocking movement. Further, since the magnetic poles produced by the hard magnetic member are determined with this construction, the rocking member can be driven by a magnetic force (attraction force or repulsion force) acting between magnetic poles of different or the same polarities, which is generated between the hard magnetic member and the soft magnetic member. Further, with this construction, a sufficiently large magnetism generating force can be attained by provision of a hard magnetic member having a large coercive force and a large magnetization and use of the coil as the magnetism generating means. Accordingly, with the rocking member apparatus of this embodiment, there can be provided an actuator that affords a large magnetism generating force while being small and having low power consumption.

According to this embodiment, the hard magnetic member preferably has a planar configuration. Also, the magnetism generating means is preferably a planar coil that is wound flatly on a surface substantially parallel to the surface on which the hard magnetic film is formed. In this case, if the above-mentioned planar coil is wound flatly at a position where it can surround the periphery of the rocking member mentioned above, such a construction of the apparatus, albeit simple, allows the amplitude of the rocking movement to be enlarged.

Further, the rocking member according to this embodiment is a planar rocking plate. Here, one hard magnetic member is provided over the entirety of a surface of the rocking plate, which illustrates one example of a construction in which different magnetic poles are formed at both ends of the rocking member across the rotation axis. With this construction, when the above-mentioned planar coil is wound in a planar fashion at a position where it can surround the periphery of the rocking member, such a construction of the apparatus, albeit simple, allows the amplitude of the rocking movement to be enlarged. That is, attraction and repulsion forces generated between the hard magnetic member and the planar coil are utilized in this case to generate a couple of forces acting in the direction for driving the rocking member. Since torques can be made to act on both ends of the rocking member at the same time, the above construction enables a large magnetism generating force to be exerted and also prevents the rocking member from being easily displaced in directions other than the rocking direction.

Needless to say, the manner in which the hard magnetic member is provided is not limited to the above but may take a variety of forms. For example, a plurality of the hard magnetic members may be provided or the hard magnetic member may be provided such that same magnetic poles are formed across the rotation axis at both ends of the rocking member. It is also possible to form the magnetic poles only at one end of the rocking member across the rotation axis. Also, depending on the manner in which the magnetic poles produced by the hard magnetic member are arranged, the planar coil and the soft magnetic member may be provided as either singular or plural members so that the torque can be made to act on the rocking member in a suitable manner.

According to this embodiment, the magnetization direction of the hard magnetic member or film is orthogonal to the direction of the rotation axis. Further, the soft magnetic member is a soft magnetic film provided along the plane of the planar coil. Still further, the soft magnetic member is provided in the form of a band, with an end thereof being arranged in close proximity to the magnetic poles produced by the hard magnetic member. Such an arrangement serves to enable reduced size and weight of the apparatus, high-speed rocking movement, and lower power consumption.

According to this embodiment, it is extremely preferable to employ one of the following positional arrangements (1), (2), and (3) in which: (1) the hard magnetic member or film is arranged on the side of the surface on which the planar coil is arranged, in relation to the surface on which the soft magnetic member or film is arranged; (2) the hard magnetic member or film is arranged on substantially the same plane as the surface on which the soft magnetic member or film is arranged; and (3) the surface on which the planar coil is arranged is arranged between the hard magnetic member or film and the soft magnetic member or film.

In other words, in the rocking member apparatus according to this embodiment, it is preferable that, as seen in the direction vertical to the surface on which the rocking member is formed, the hard magnetic member and the soft magnetic member be arranged at the same position or the hard magnetic member be arranged on the side where the coil is arranged, as seen from the soft magnetic member.

In the rocking member apparatus of this embodiment constructed as described above, a larger torque can be generated and a large force can be exerted on the rocking member. Additionally, it is possible to achieve reduced power consumption or reduced size of the apparatus.

Further, the rocking member apparatus of this embodiment includes an elastic supporting portion and a supporting substrate. The elastic supporting portion couples and supports the rocking member onto the supporting substrate. The elastic supporting portion consists of a pair of torsion springs (torsion bars) which extend in the direction of the rotation axis and support the rocking member from two side surfaces thereof. Here, it is possible to adopt an arrangement in which the rocking member is elastically supported to the supporting substrate by the pair of torsion springs extending along a straight line, for free rocking movement substantially about the straight line. Then, by inverting the direction of the torque, the rocking member can make reciprocating rocking movement.

In accordance with this embodiment, the soft magnetic member or film and the planar coil may be formed on the supporting substrate or only the planar coil may be formed on the supporting substrate. Further, the soft magnetic member or film and the planar coil may also be formed on another substrate arranged in opposed and spaced relationship to the supporting substrate. Still further, only the soft magnetic member or film may be formed on another substrate arranged in opposed and spaced relationship to the supporting substrate that supports the rocking member.

Further, the above-mentioned substrate arranged in opposed relationship preferably includes a window or concave portion formed at a position corresponding to the rocking member. In this case, it is preferable that the edges of the window or concave portion be arranged in close proximity to the edges of the rocking member. With such an arrangement, it is possible to provide a rocking member apparatus in which there is virtually no fear that the substrate arranged in opposed relationship will interfere (abut) with the bottom surface of the rocking member, whereby, for example, an optical deflector that affords a large deflection angle can be realized relatively easily.

In this embodiment, the torsion spring, the rocking member, and the supporting substrate are formed integrally with each other. Although they may of course be formed separately from each other, the integrated construction is preferred, and it is further preferred from the viewpoint of mechanical strength that they are formed of the same material. It is also preferred that these components are each constituted by a single-crystal silicon. The rocking member apparatus is manufactured using micro-machining techniques (that is, by semiconductor processing such as etching).

The rocking member apparatus in accordance with this embodiment may itself constitute a deflector element or may be an apparatus provided with such a deflector element. The rocking member apparatus is constituted as an optical deflector. The deflector element may be constituted by a reflecting surface (mirror surface) for reflecting light or by a diffraction grating. When the optical deflector element is constituted by the reflecting surface, there can be realized an optical deflector or the like which is easy to manufacture and in which the mass of its movable portion (rocking member) is small. Further, when the optical deflector element is constituted by the diffraction grating, incident light can be deflected while being split into a plurality of beams.

Further, the rocking member apparatus according to this embodiment may also be constituted as a rocking member actuator or the like.

Further, the rocking member apparatus according to this embodiment can be used as an optical deflector for applications as a component of an image display apparatus. In that case, the image display apparatus includes a light source (such as a semiconductor laser capable of performing modulation), an optical deflector or a group of optical deflectors having at least one above-described optical deflector arranged therein for deflecting light emitted from the above-mentioned light source, and a lens for projecting at least part of the light deflected by the optical deflector or the group of optical deflectors. The modulation by the light source and operation of the rocking member of the optical deflector can be controlled by control means. In this way, the rocking member apparatus according to this embodiment may be applied to an image display apparatus to realize an extremely small and inexpensive image display apparatus.

Further, the rocking member apparatus according to the present embodiment may be used for applications as a two-dimensional optical deflector. More specifically, there can be provided a two-dimensional optical deflector having a rocking plate provided with a mirror surface that is rotatable about a rotation axis, the two-dimensional optical deflector including a first rocking plate having a mirror surface, a first torsion spring which is coupled to the first rocking plate at one end so as to rotatably support the first rocking plate, a second rocking plate for supporting the other end of the first torsion spring, a second torsion spring which is coupled to the second rocking plate at one end so as to rotatably support the second rocking plate, and a supporting substrate for supporting the other end of the second torsion spring, wherein a hard magnetic film that has been magnetized is provided to at least one of the first and second movable plates and a coil is wound in a planar fashion on the supporting substrate at a position where it can surround the periphery of the first and second movable plates.

In other words, in the above rocking member apparatus, the rocking member is coupled through the torsion spring to another rocking member apparatus situated outside thereof, the another rocking member apparatus situated outside the rocking member apparatus is coupled to the supporting substrate through another torsion spring that is different from the torsion spring, and the longitudinal direction of the torsion spring and the longitudinal direction of the another torsion spring intersect each other. In an alternative construction of the rocking member apparatus, the rocking member is coupled to the supporting substrate through the torsion spring, another rocking member that is different from and situated inside the rocking member is coupled to one rocking member through another torsion spring, and the longitudinal direction of the torsion spring and the longitudinal direction of the another torsion spring intersect each other. With this construction, a soft magnetic film is preferably provided along the plane of the planar coil, with an end thereof being arranged in close proximity to magnetic poles produced by the hard magnetic member. A light source, the two-dimensional optical deflector described above, and a lens for projecting at least part of the light deflected by the optical deflector can together constitute a small and inexpensive image display apparatus.

(Embodiment)

Embodiment of the present invention will be described hereinbelow based on a typical example of an optical deflector. The optical deflector according to Embodiment can be manufactured by using micro machining techniques and it typically includes a movable plate having a mirror and a hard magnetic film, a planar coil, a fixed core constituted by a soft magnetic film provided along the plane of the planar coil, and an elastic supporting portion for rotatably supporting the above-mentioned movable plate to a supporting substrate.

The following provides a description with regard to the driving principle for such a typical example of an optical deflector. Essentially the same driving principle is employed in the rocking member apparatus of the present invention.

The hard magnetic film of the movable plate is magnetized in a direction normal to the rocking axis so as to have S- and N-magnetic poles at its respective ends. Due to a current flowing in the coil, magnetic fields having the same polarity and the same strength are generated at two ends of the fixed core (soft magnetic film) situated close to the movable plate. Both the magnetic poles of the movable plate react with these magnetic fields so that there is generated a torque acting about the axis of the elastic supporting portion, thus causing the movable plate to rotate. Here, assuming that an alternating current is made to flow in the coil, the movable plate having the mirror is caused to rock in a fixed cycle, thereby oscillating/deflecting light irradiated onto the mirror.

In the construction as described above, the overall thickness of the apparatus can be reduced by reducing the film thickness of the coil. However, to realize the same number of turns as a cubic coil, the planar coil needs to have a large horizontal sectional area. The fixed core constituted by the soft magnetic film is provided to overcome this dilemma. The provision of the fixed core constituted by the soft magnetic film offers the following advantages. First, a large light deflection angle (large rotation angle of the movable plate) can be achieved due to generation of a large magnetic field afforded by the fixed core. Second, a magnetic field of a given magnitude can be obtained with less electric current, thus realizing reduced power consumption. Third and lastly, a magnetic field of a given magnitude can be obtained with smaller number of turns of the coil, thus realizing miniaturization of the apparatus.

In introducing the fixed core (soft magnetic film) into the apparatus, the positional relationship among the coil, the hard magnetic film, and the soft magnetic film becomes an important consideration. Generally, when the soft magnetic film is arranged in proximity to the coil, magnetic poles are produced at end portions of the soft magnetic film, thus generating a large magnetic field. However, the concentration efficiency of the magnetic field distribution may drop depending on the positional arrangement employed, so that there is a need for an optimized configuration.

According to Embodiment, the surface on which the magnetic poles produced by the hard magnetic film are formed is arranged on the side of the surface on which the coil is formed, in relation to the surface on which the soft magnetic film is formed, or is arranged on substantially the same plane as the surface on which the soft magnetic film is formed. Corresponding to the arrangement described above are the following three positional arrangements (1), (2), and (3) in which: (1) the surface on which the coil is formed is arranged between the surface on which the soft magnetic film is formed and the surface on which both the magnetic poles produced by the hard magnetic film are formed; (2) the surface on which both the magnetic poles produced by the hard magnetic film are formed is arranged between the surface on which the soft magnetic film is formed and the surface on which the coil is formed; and (3) the surface on which the soft magnetic film is formed lies on substantially the same plane as the surface on which both the magnetic poles produced by the hard magnetic film are formed.

Figure 9A:
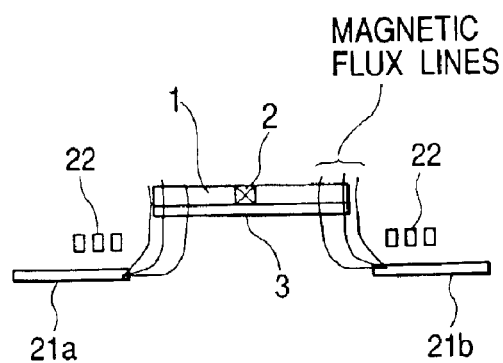
FIGS. 9A, 9B, 9C and 9D are views each illustrating a positional arrangement of a coil, a hard magnetic film, and a soft magnetic film of the present invention.
Figure 9B:
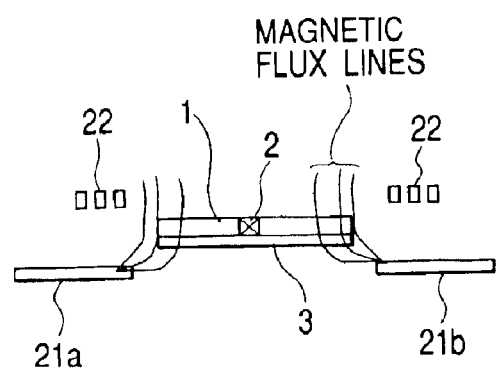

FIGS. 9A to 9D illustrate relative positional arrangement of a coil 22, a hard magnetic film 3, and a soft magnetic films 21a, 21b. Here, the drawings depict only the cross section of the coil, although in actuality the coil surrounds the periphery of a movable plate. In the drawings, reference numeral 1 denotes a movable plate and 2 an elastic supporting portion, and there is schematically illustrated part of magnetic flux lines produced by the soft magnetic films 21a, 21b. A detailed illustration of the magnetic flux lines will be described as an example of simulation in subsequent explanation of examples of the present invention. FIG. 9A corresponds to the positional arrangement (1) described above, FIG. 9B corresponds to the positional arrangement (2), and FIGS. 9C and 9D correspond to the positional arrangement (3).

Figure 9C:
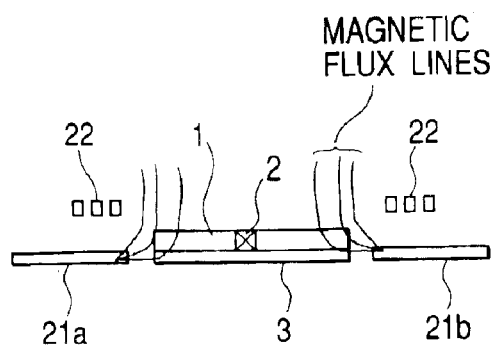
Figure 9D:
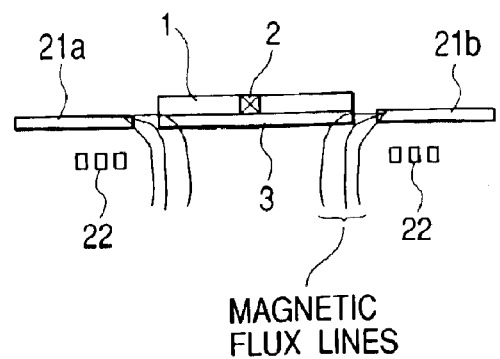

Referring to FIG. 9A for explanation of the drawing, a large magnetic field with a high density of magnetic flux lines is generated at end portions of the soft magnetic films 21a, 21b, and the magnetic flux lines are directed upwardly toward the position where the coil 22 is arranged. When situated on the side of the coil 22 relative to the soft magnetic films 21a, 21b, both the magnetic poles produced by the hard magnetic film 22 that is provided to the movable plate 1 receive a large magnetic field acting in the direction orthogonal to the hard magnetic film, whereby the movable plate 1 can gain a large rotational torque. The same is true for the positional arrangement shown in FIG. 9B. Positional relationships allowing effective magnetic field generation can be defined as being from the positional relationships of FIGS. 9A and 9B to the positional relationship where both the magnetic poles produced by the hard magnetic film and the soft magnetic film are arranged on substantially the same plane. If, beyond the above-described positional relationship in which the respective surfaces lie on the same plane, the surface on which both the magnetic poles produced by the hard magnetic film are formed is arranged on the side opposite to the coil 22 as seen from the surface of the soft magnetic films 21a, 21b, the strengths of the magnetic fields generated at both the magnetic poles will conversely decrease. Hence, the positional limit for obtaining a large rotational torque may be represented as shown in FIGS. 9C and 9D.

When the soft magnetic films 21a, 21b are placed close to both the magnetic poles produced by the hard magnetic film, a large magnetic force acts on both the magnetic poles. However, if the direction of the force is deviated from the direction of rotation of the movable plate 1, fewer components of the force will contribute to the movement of the movable plate 1. Therefore, preferred are the positional arrangements of FIGS. 9A and 9B where a larger number of magnetic field components act in the direction orthogonal to the direction for connecting both the magnetic poles produced by the hard magnetic film 22. Such arrangements enable construction of a miniaturized optical deflector, which achieves a large deflection angle with lower power consumption.

When manufacturing the optical deflector shown in FIG. 9A, the optical deflector may be constituted by a supporting substrate for supporting the movable plate 1 and the elastic supporting portion, and another substrate having the coil 22 and the soft magnetic films 21a, 21b formed thereon. For manufacture of the optical deflector shown in FIG. 9B, it is necessary to provide three substrates consisting of a supporting substrate for supporting the movable plate 1 and the elastic supporting portion, a substrate having the coil 22 formed thereon, and a substrate having the soft magnetic films 21a, 21b formed thereon. From the above discussion, it can be concluded that the most preferred positional arrangement is the arrangement shown in FIG. 9A where the soft magnetic film, the coil, and the hard magnetic film are arranged in this order in terms of their relative height positions.

The movable plate 1 may have the hard magnetic films formed on its both surfaces so as to be magnetized in the same direction, instead of having the hard magnetic film formed on one surface thereof. In order to generate a large rocking force for the movable plate 1, at least one of the hard magnetic films needs to satisfy one of the aforementioned positional relationships.

It is possible to form the soft magnetic films 21a, 21b and the coil 22 on a supporting substrate 10 supporting the movable plate 1. Also, the soft magnetic films 21a, 21b and the coil 22 may be formed on a second substrate, which is arranged so as to oppose the supporting substrate that supports the movable plate 1. In the case where the second substrate is provided, it is preferable to form a window portion or a concave portion at a location facing the movable plate 1. The following two advantages can be attained by forming the window portion, which is formed as a hole penetrating the substrate, or the concave portion. First, the arrangement prevents the movable plate 1 from coming into contact with the second substrate when it is displaced upon its torsional rotation. Second, the arrangement prevents an air damping from being formed between the movable plate 1 and the second substrate upon displacement of the movable plate, thus avoiding reduction in the Q-value of the vibration system. As for the case of forming the window portion, this arrangement provides an additional advantage that light to be deflected can be made to enter through the window portion.

The elastic supporting portion for the movable plate 1 may also be constituted by a single crystal silicon. The single crystal silicon is a material excellent in terms of its availability and mechanical characteristics (that is, a material excellent in terms of its physical strength, resistance characteristics, and life-time while being relatively lightweight). When the elastic supporting portion is thus constituted by the single crystal silicon, the attenuation coefficient of the elastic supporting portion becomes lower, allowing a large Q value to be obtained in the case where resonance is utilized. Further, the single crystal silicon does not suffer from fatigue fracture that would occur in the case of metallic materials due to its repeated deformations, thus allowing construction of an optical deflector with a long life.

Further, the single crystal silicon is a material suitable for forming a mechanical part with high shape reproducibility, since it can be machined with high precision using semiconductor circuit manufacturing techniques. By performing drying etching using a reactive gas or anisotropic etching using an alkali solution, the elastic supporting portion, the movable plate, and the supporting substrate can be integrally formed on the same silicon substrate, thus allowing formation of a structure with none of its coupling portions being provided as separate bodies. In such a structure, reduction in energy transfer efficiency does not easily occur in the coupling portions, so that a large Q-value can be attained for cases in which resonance is utilized for the movable plate.

For the mirror surface, there is used a material having a high reflection coefficient with respect to light to be polarized. For the visible region, preferred is aluminum, silver, or the like, whereas for the infrared region, it is possible to use aluminum, silver, gold, copper, rhodium, or the like.

In addition to a method of forming a thin film of Sm—Co, Co—Cr, Co—Pt, Co—P, Co—Ni, Ni—P, or the like by plating, spattering or other such means, the hard magnetic film 3 may be formed by a method of adhering a permanent magnet of Fe—Co—Cr, or by a method of coating a pasty adhesive having powdered rare-earth permanent magnet of, for example, Nd—Fe—B mixed therein and leaving it to solidify. The hard magnetic film 3 is previously magnetized in a predetermined direction under presence of a strong magnetic field so as to become a permanent magnet.

As for the soft magnetic films 21a, 21b as the fixed core, a magnetic material such as Fe—Ni (permalloy), Fe—Si, Fe—N, Fe—Zr—Nb, Co—Fe—B, or the like with a low coercive force, a small remanent magnetization, a large saturation magnetization, and a small magnetic loss can be used to form a thin film by plating, spattering or other such means.

The optical deflector according to Embodiment described hereinabove can be used in video projectors using a laser display or in laser beam printers. When applied to these apparatuses that require a high speed operation and a wide deflection angle, the optical deflector according to Embodiment can meet such requirements.

The optical deflector according to Embodiment can be driven at a scanning frequency of 14 kHz in the case where the vertical scanning speed is set at 60 Hz and reciprocating scanning movement by laser beams is utilized to achieve horizontal scanning of a VGA-quality resolution (the number of horizontal scanning lines: 480) with the optical deflector.

If constructed with a so-called bulk-type structure, the optical deflector according to Embodiment can be mounted to portable equipment. Further, the low power consumption of the optical deflector allows the portable equipment incorporating it to be driven by a battery.

Hereinafter, examples of the invention will be described in more detail with reference to the accompanying drawings.

EXAMPLE 1

Figure 2:
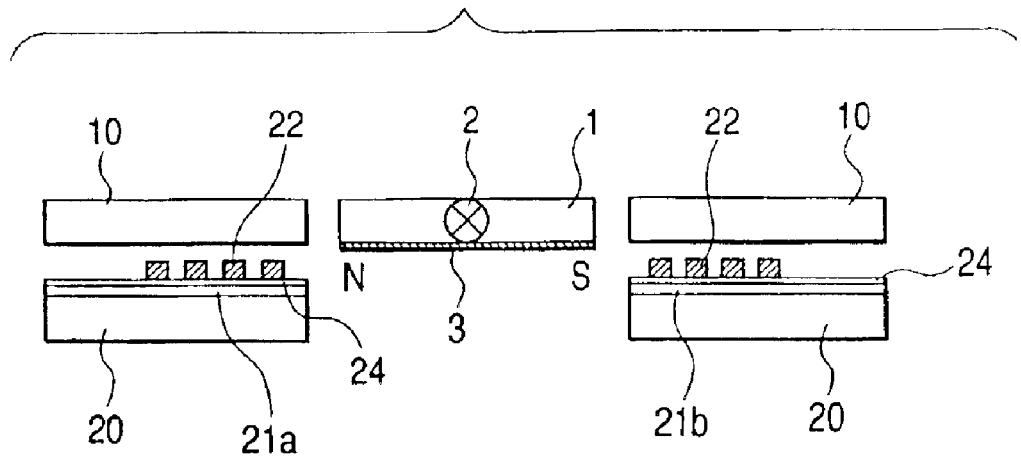
FIG. 2 is a sectional view of Example 1 of the present invention, which shows a magnetization state of a permanent magnet formed on a movable plate.

FIG. 1 is an exploded view showing an optical deflector according to Example 1 of the present invention. FIG. 2 is a sectional view taken along a broken line 2—2 of FIG. 1 and viewed from a direction A thereof. The optical deflector of this example is constituted of a supporting substrate 10 and a second substrate 20. In the supporting substrate 10 on the upper side, a movable plate 1 is supported by a pair of torsion springs 2 extending in a uniaxial direction. On the upper surface and the lower surface of the movable plate 1, there are provided a mirror surface (not shown) and a hard magnetic film 3, respectively. The hard magnetic film 3 is previously magnetized within a plane thereof in a direction orthogonal to the axial direction of the torsion springs 2, to become a permanent magnet. Therefore, a magnetic pole, an N-pole or an S-pole, appears in a side of the movable plate 1 which has no torsion spring. FIG. 2 shows a magnetization state of the permanent magnet 3 on the movable plate 1. On the second substrate 20, there are provided fixed cores 21a and 21b and a plane coil 22 that is formed on the fixed cores 21a and 21b through an insulating film 24.

The optical deflector of this example was manufactured by using a method described below.

The supporting substrate 10, the movable plate 1, and the torsion springs 2 were formed by etching a single crystal silicon substrate and then forming therein two opening portions 4 and 5 as shown in FIG. 1. As a result, the supporting substrate 10, the movable plate 1, and the torsion springs 2 were integrally formed of single crystal silicon, whereby a vibration system having a large Q-value was obtained. The above mirror surface was obtained by forming an aluminum film onto the front surface of the movable plate 1 by electron-beam evaporation. The hard magnetic film 3 was formed by adhering a section of the permanent magnet of Fe—Co—Cr onto the rear surface of the movable plate 1.

As the second substrate 20, a silicon substrate was used which included a silicon dioxide film formed by thermal oxidation. First, on the substrate 20, there were formed by plating Fe—Ni (permalloy) soft magnetic films to be the fixed cores 21a and 21b each having a predetermined pattern. The insulator thin film 24 was next obtained by forming a silicon dioxide film on the soft magnetic films 21a and 21b by sputtering which was a type of vacuum evaporation. Subsequently, a copper film was formed on the insulator thin film 24, a photoresist was then applied thereto, and after exposure and development, patterning was performed through ion milling by using an Ar gas. Thus, the plane coil 22 was obtained. Thereafter, dry etching was performed from the rear surface of the second substrate 20, to thereby obtain a window portion 23.

After the above processes, the upper supporting substrate 10 and the lower supporting substrate 20 were coupled to each other with predetermined dimensions, whereby the optical deflector of the present invention was produced. The operation principle of this optical deflector is the same as that described above in accordance with the embodiments of the invention. The same operation principle applies to Example 2 and the following examples.

Figure 3:
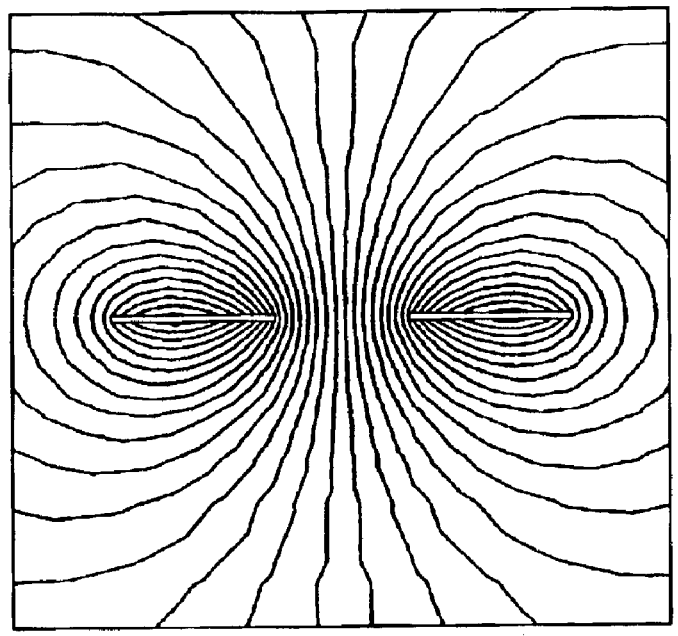
FIG. 3 shows a pattern of magnetic flux lines generated by a coil as a result of a simulation.
Figure 4:
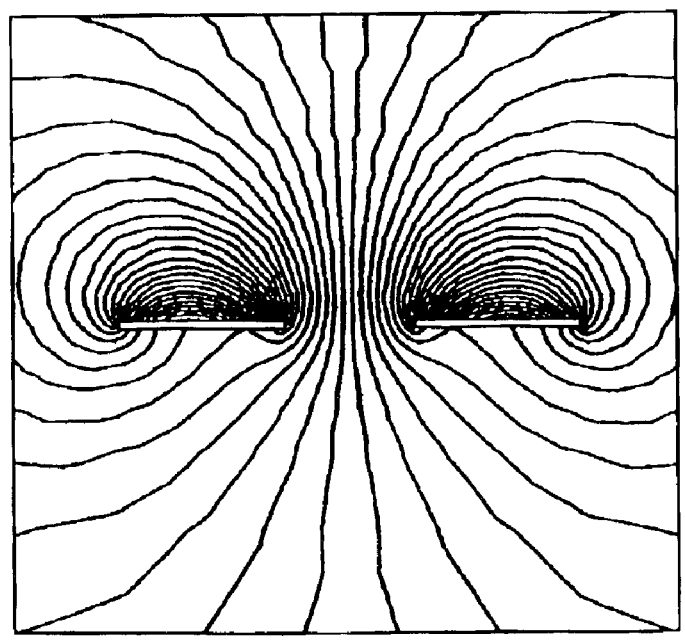
FIG. 4 shows view for explaining the effect of magnetic flux lines generated as a result of a simulation when soft magnetic films are formed on the lower side of the coil used in FIG. 3.

FIG. 3 shows magnetic flux lines of the magnetic field generated by a coil wound in a planar fashion, based on a simulation. In the drawing, which is viewed along the mirror section direction similar to FIG. 2, the two horizontal line segments indicate the coil. It is apparent that the distribution of the magnetic flux lines is symmetric between the upper portion and the lower portion with respect to the plane of the coil. FIG. 4 shows view for explaining the effect in the case where the soft magnetic films are attached onto the lower side of the coil along its plane. In this case, it is apparent that the distribution of the magnetic flux lines is asymmetrical between the upper portion and the lower portion with respect to the coil.

Figure 5:
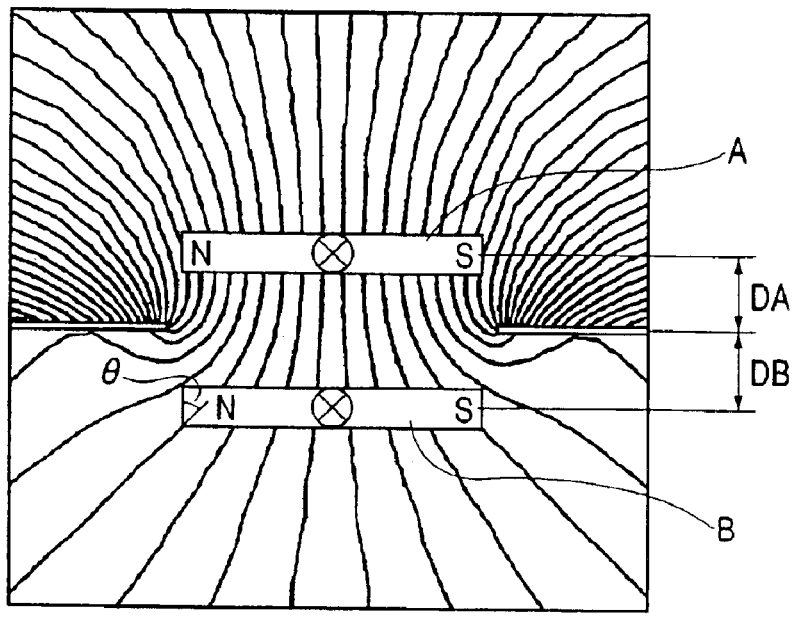
FIG. 5 is an enlarged view of the center part of FIG. 4, which explains a relationship between the position of the movable plate and the direction of a magnetic field.

Assuming that the movable plate is arranged such that both end portions thereof across the rotation axis are each situated near an inner end surface of the coil as shown in FIG. 5, at the position B, an angle θ between the tangential direction of the magnetic flux line, that is, the magnetic field direction, and rotational direction (vertical direction as viewed in the drawing) of the movable plate becomes large. On the contrary, at the position A, the magnetic field direction is closer to the rotational direction of the movable plate. Therefore, more magnetic field components contribute to the rotational motion of the movable plate. If the movable plate is positionally arranged such that the magnetic fluxes at the N-pole and the S-pole flow in a direction orthogonal to the direction from N-pole to S-pole (in the drawing, horizontal direction), a higher efficiency is attained in terms of rotation of the movable plate. In this respect, more preferred is the position A where the movable plate is located on the side opposite to the soft magnetic film, across the plane of the coil. Therefore, in this example, the movable plate 1 having the hard magnetic film 3, the fixed cores 21a and 21b, and the plane coil 22 were provided in the relative positional arrangement as shown in FIG. 2. Note that the magnetic flux lines in FIG. 5 are indicated without taking into consideration the magnetic influence of the movable plate. Nevertheless, the above conclusion is still valid as it is. Also, the entire movable plate 1 is assumed to be a magnet in FIG. 5.

Here, a prototype was produced and an experiment using it is performed under the following conditions.

Thickness of movable plate: t=20 μm
Width of movable plate: W=1.0 mm (in horizontal direction of FIG. 5)
Length of movable plate: L=1.28 mm (in vertical direction of FIG. 5)
Magnetization of movable plate: M=0.65 T (tesla)
Thickness of soft magnetic film: ts=20 μm
Width of soft magnetic film: Ws=1.0 mm
Length of soft magnetic film: Ls=1.6 mm
Relative permeability of soft magnetic film: μ=1,000
Thickness of coil: tc=40 μm
Gap between coil and soft magnetic film: gcs=5 μm (with soft magnetic film being at position lower than coil)
Number of turns of coil: T=50 turns
Current made to flow in coil: I=20 mA
Distance from center of soft magnetic film at position A: DA=100 μm (upward)
Distance from center of soft magnetic film at position B: DB=100 μm (downward)
Horizontal distance between end portion of movable plate and coil/soft magnetic film: DC=50 μm As a result of the experiment, at the position A, when the soft magnetic films existed, the rotation angle of the movable plate became large to increase the deflection angle in comparison with the case where the soft magnetic films did not exist. The torque was calculated from the rotation angle and the spring constants of the elastic supporting portion of the movable plate, and the result revealed that the torque was increased by approximately 50% due to the presence of the soft magnetic films. This is because there were more magnetic field components that contributed to the rotation of the movable plate and less magnetic field components that inhibited the rotation.

On the other hand, at the position B, when the soft magnetic film existed, the torque was reduced to 40% of the torque as obtained in the case where the soft magnetic film did not exist. This is because not only there were less magnetic field components acting in the rotational direction of the movable plate, but also there were more magnetic field components acting in directions moving apart from the rotation axis toward the right and left sides as shown in FIG. 5, which acted to inhibit the rotation of the movable plate. Also, if the movable plate was arranged at a position between the positions A and B, the magnetic flux lines were densely distributed around the end portions of the soft magnetic film and the deflection angle was increased as compared with the position B, thereby increasing the torque. Thus, the construction in which the movable plate is arranged at a position between the positions A and B also falls within the scope of the present invention.

EXAMPLE 2

Figure 6:
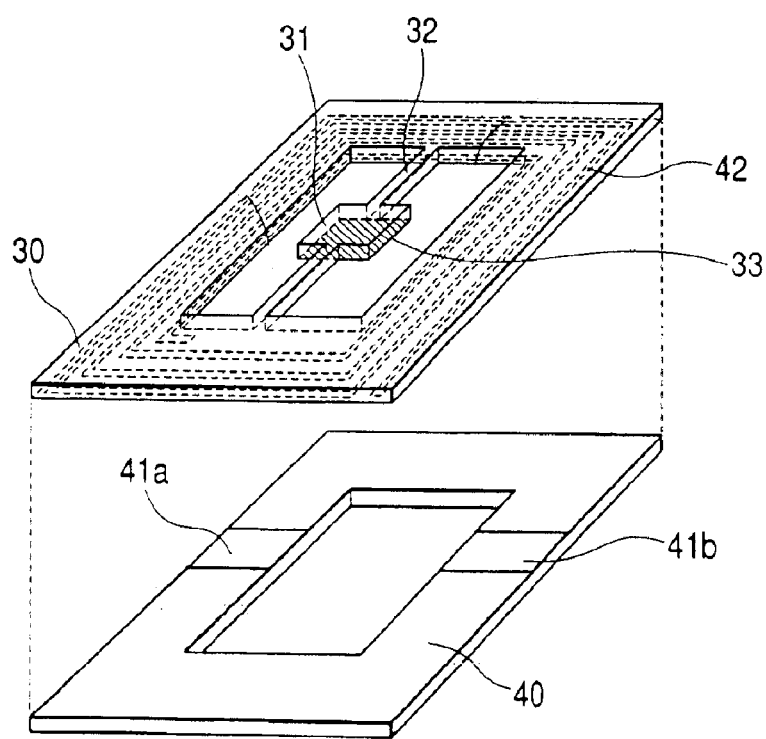
FIG. 6 is an exploded view showing Example 2 of the present invention.

FIG. 6 is a view for explaining Example 2 of the present invention, which had the same positional arrangement as Example 1 except that a coil 42 was formed on the lower surface of a supporting substrate 30.

In Example 2, soft magnetic films 41a and 41b were formed on a second substrate 40. An optical deflector of this example was constituted of the supporting substrate 30 and the second substrate 40. In the supporting substrate 30 on the upper side, a movable plate 31 was supported by a pair of torsion springs 32. On the upper surface and the lower surface of the movable plate 31, there were provided a mirror surface and a hard magnetic film 33, respectively. On the lower surface of the supporting substrate 30 that supported one end of each of the torsion springs 32 (surface on the side where the hard magnetic film 33 was formed), the plane coil 42 was formed. The hard magnetic film 33 was magnetized within a plane thereof in a direction orthogonal to the axial direction of the torsion springs 32, to become a permanent magnet. Therefore, a magnetic pole, an N-pole or an S-pole, appeared in a side of the movable plate 31, which had no torsion spring 52. On the other hand, as described above, there were formed on the second substrate 40 the soft magnetic films to be the fixed cores 41a and 41b.

The positional arrangement of the plane coil 42, the hard magnetic film 33, and the soft magnetic films 41a and 41b was the same as Example 1. Due to the provision of the soft magnetic films 41a and 41b, the rotation angle of the movable plate 31 became large, thus increasing the deflection angle in comparison with the case where the soft magnetic films did not exist. Also, the torque applied to the movable plate 31 was increased by thus providing the soft magnetic films 41a and 41b, whereby even if the spring constants of the torsion springs 32 were increased, it became possible to obtain the rotation angle equivalent to that in the case where the soft magnetic films did not exist, by applying the same current to the plane coil 42. If the spring constants of the torsion springs 32 were increased, the resonance frequency of this vibration system was increased. As a result, it became possible to perform scanning at a high speed using the mirror surface of the movable plate 31. These features were similar to those of Example 1.

EXAMPLE 3

Figure 7:
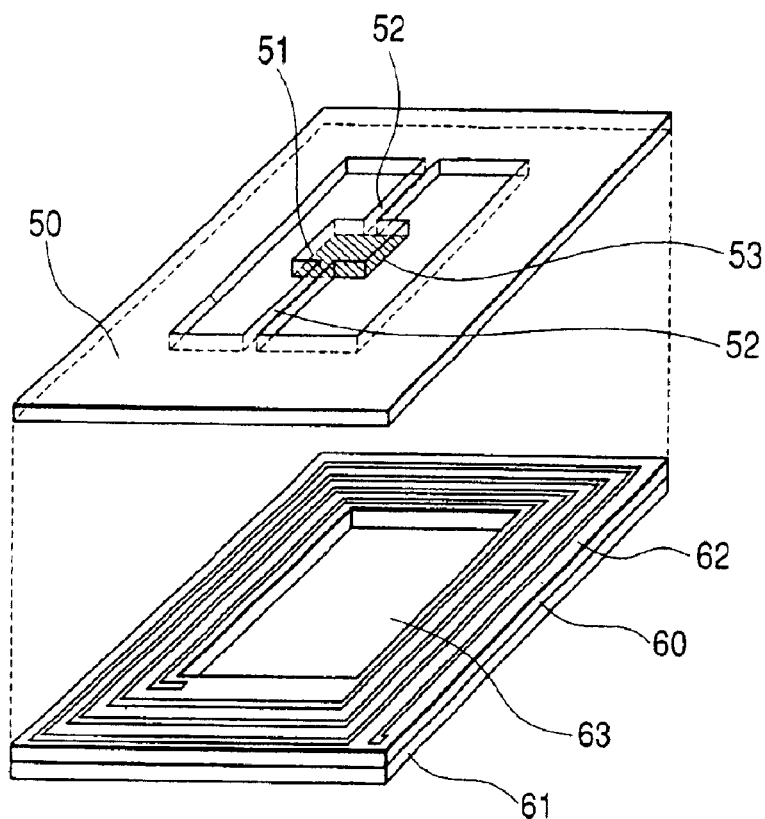
FIG. 7 is an exploded view showing Example 3 of the present invention.

FIG. 7 is an exploded view for explaining an optical deflector according to Example 3 of the present invention. In Example 3, a soft magnetic film 61 was adhered over the entire lower surface of a second substrate 60 and the number of the fixed core was 1.

The optical deflector of this example is constituted of a supporting substrate 50 and the second substrate 60. In the supporting substrate 50 on the upper side, a movable plate 51 was supported by a pair of torsion springs 52. On the lower surface of the movable plate 51, there was provided a hard magnetic film 53. On the upper surface of the second substrate 60, a plane coil 62 was formed. The soft magnetic film to be the fixed core 61 was formed over the entire lower surface of the second substrate 60. The hard magnetic film 53 was magnetized within a plane thereof in a direction orthogonal to the axial direction of the torsion springs 52, to become a permanent magnet. Therefore, a magnetic pole, an N-pole or an S-pole, similarly appeared in a side of the movable plate 51, which had no torsion spring 52. A window portion 63 was provided to the second substrate 60. In this example, the hard magnetic film 53 is used as the mirror surface and light to be deflected was made incident thereupon from the window portion 63 side of the second substrate 60.

In this example, the area of the soft magnetic film 61 was larger than that of Example 1 and that of Example 2, whereby a larger magnetic field was generated. More specifically, not only were large magnetic fields generated in parts of the soft magnetic film 61 on the right and left sides of the second substrate 60 as seen in FIG. 7, the soft magnetic film also acted to generate large magnetic fields at the magnetic poles of the hard magnetic film 53. In addition, parts of the soft magnetic film 61 on the upper and lower sides of the second substrate 60 as seen in FIG. 7 also acted to generate large magnetic fields on the upper and lower sides of the magnetic poles of the hard magnetic film 53. Also, during the manufacture, it was unnecessary for masking to be performed for the fixed core 61 to be formed over the entire lower surface of the second substrate 60, thereby reducing the number of the processing steps.

EXAMPLE 4

Figure 8:
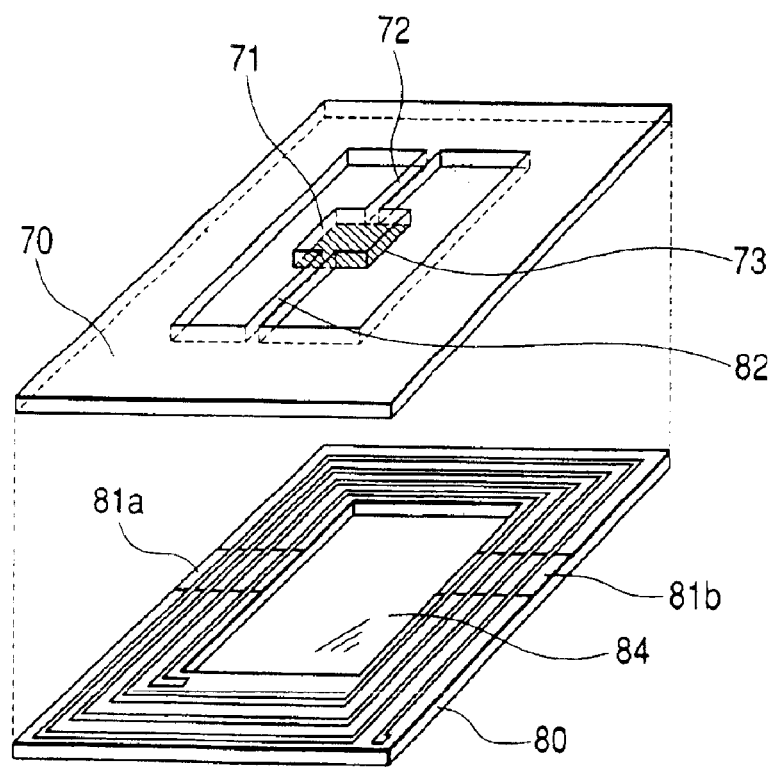
FIG. 8 is an exploded view showing Example 4 of the present invention.

FIG. 8 is an exploded view for explaining Example 4 of the present invention. Example 4 had the same construction as Example 1 except that a concave portion 84 was provided by forming a step portion in a second substrate 80 instead of forming the opening portion as the window portion penetrating the second substrate 80.

The optical deflector of this example was also constituted of a supporting substrate 70 and the second substrate 80. In the supporting substrate 70 on the upper side, a movable plate 71 was supported by a pair of torsion springs 72. On the upper surface and the lower surface of the movable plate 71, there were provided a mirror surface and a hard magnetic film 73, respectively. This hard magnetic film 73 was magnetized within a plane thereof in a direction orthogonal to the axial direction of the torsion springs 72, to become a permanent magnet. Therefore, a magnetic pole, an N-pole or an S-pole, appeared in the side of the movable plate 71, which had no torsion spring 72. There were formed on the second substrate 80 fixed cores 81a and 81b and a plane coil 82 that was formed on the fixed cores 81a and 81b through an insulating film (not shown).

The above-mentioned concave portion 84 had an enough step depth to secure the movable area for the movable plate 71 having the mirror surface. In the optical deflector of this example which was manufactured based on the same positional arrangement as that of Example 1, the rigidity was enhanced by providing the concave portion 84 instead of the window portion, thereby allowing easier handling of the optical deflector thus manufactured. Also, no mechanical damage was caused from the rear surface of the apparatus so that the mirror surface was protected.

EXAMPLE 5

Figure 11:
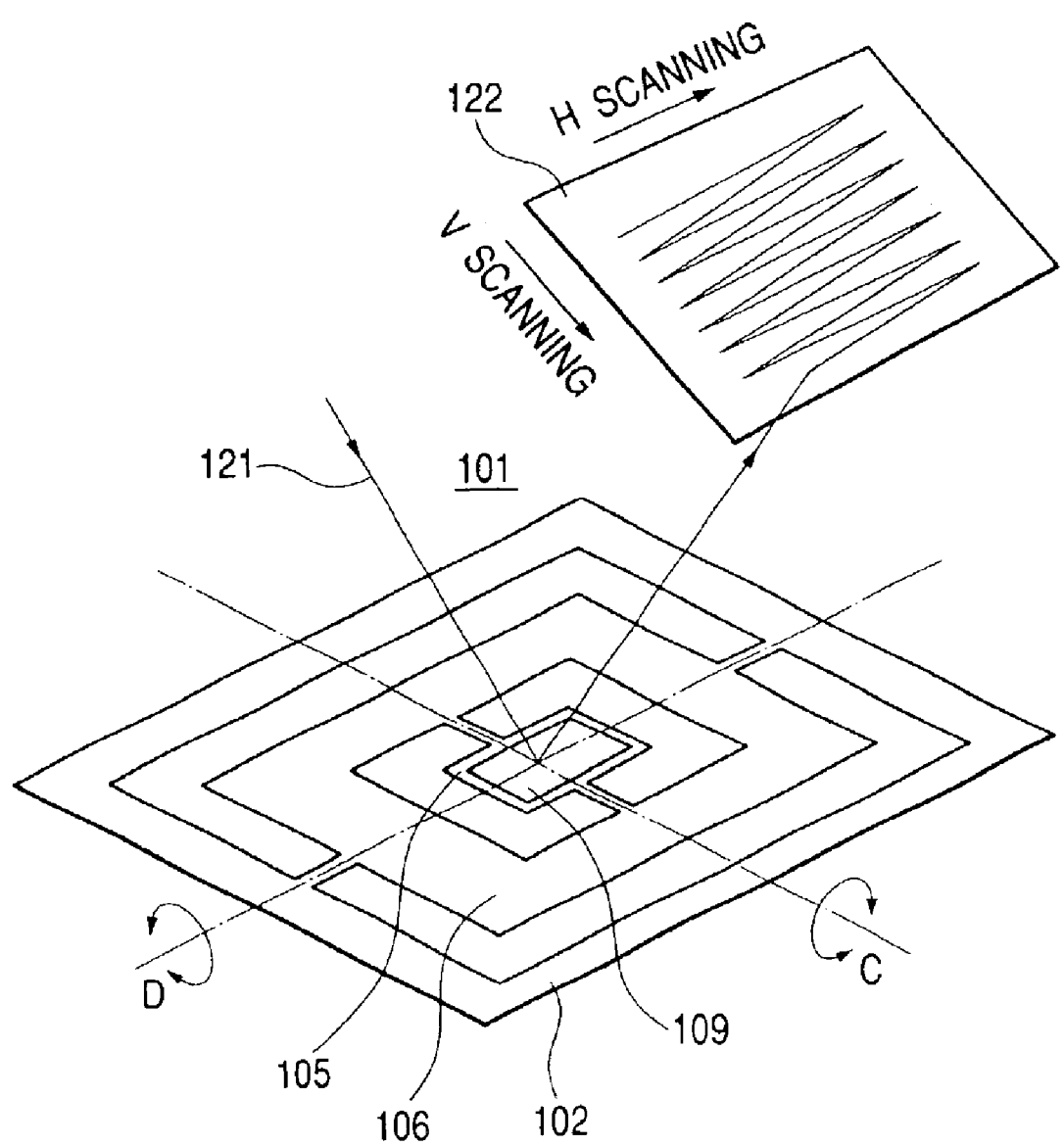
FIG. 11 is a conceptual view showing the two-dimensional optical deflector according to Example 5 of the present invention.

FIGS. 10A to 10C each show a two-dimensional optical deflector 101 according to Example 5 of the present invention. FIG. 10A is a top view of the optical deflector of this example, FIG. 10B is a sectional view taken along a broken line 10B—10B of FIG. 10A, and FIG. 10C is a sectional view taken along a broken line 10C—10C of FIG. 10A. FIG. 11 is a schematic diagram showing a basic construction of an image display apparatus using the optical deflector of the present invention. In FIG. 11, there are only shown a supporting substrate 102 and a first movable plate 105 and a second movable plate 106 which are supported by the supporting substrate 102.

The construction of Example 5 will be described. According to this example, the first supporting substrate 102 and a second supporting substrate 103 were joined on the upper and the lower surfaces of a spacer substrate 104, respectively. In the frame-shaped first supporting substrate 102, a first movable plate 105 and a second movable plate 106 were elastically supported by a pair of torsion springs 107 and a pair of torsion springs 108, respectively, for free torsional vibration about a rotation axis C and a rotation axis D, respectively. On one surface of the first movable plate 105, there was provided a reflecting surface 109 for reflecting light. On one surface of the second movable plate 106, hard magnetic films 110 and 111 were arranged on both end sides (in vertically opposite positions across the first movable plate 105 as seen in FIGS. 10A to 10C).

The hard magnetic films 110 and 111 were arranged so as to be vertically symmetrical with respect to the rotation axis C as seen in FIGS. 10A to 10C. However, a hard magnetic film alternatively may be arranged on the entire surface of the second movable plate 106. The hard magnetic films 110 and 111 were each magnetized in right and left directions, as seen in FIGS. 10A to 10C, so that the magnetic poles came to oppose soft magnetic films 116 and 117 that were formed on the first supporting substrate 102. On the first supporting substrate 102, a coil 112 was wound so as to circle around the movable plates 105 and 106, and pads 113 and 114 were provided on the terminals of the coil 112. Further, an insulating layer 115 was formed on the first supporting substrate 102 to which the coil 112 was provided. On the insulating layer 115, the soft magnetic films 116 and 117 were each arranged so as to face the magnetic poles of the hard magnetic films 110 and 111.

On the second substrate 103, fixed electrodes 118 and 119 were arranged across the rotation axis C at positions corresponding to the lower surface of the first movable plate 105 opposite to the reflecting surface 109. On the surface of the first movable plate 105 opposite to the reflecting surface 109, a movable electrode 120 was provided.

Next, the operation principle of the optical deflector of this example will be described hereinafter with reference to FIGS. 10A to 10C and the schematic view of the image display apparatus in FIG. 11. This optical deflector is adapted to two-dimensionally scan a light beam 121. By applying a voltage between the fixed electrodes 118 and 119 and the movable electrode 120, the first movable plate 105 makes torsional rotation through the torsion springs 107 about the rotation axis C. Accordingly, the light beam 121 made incident upon the reflecting surface 109 in FIG. 11 is scanned on a screen 122 in the H-direction. V-scanning is performed by torsionally rotating the movable plate 106 through the torsion springs 108 about the rotation axis D by using the hard magnetic films 110 and 111 and the coil 112.

With respect to the hard magnetic films 110 and 111 which are previously magnetized in the horizontal direction as seen in FIGS. 10A to 10C, the magnetic field within the coil 112 is varied by changing a current to flow to the coil 112, so that the rotation torque is generated at the poles of the hard magnetic films 110 and 111 on the second movable plate 106, thereby torsionally rotating the second movable plate 106. Accordingly, the light beam 121 made incident upon the reflecting surface 109 in FIG. 11 is scanned on the screen 122 in the V-direction. The first movable plate 105 is provided inside the second movable plate 106 in a nested structure, whereby raster scanning in which the light beam 121 is H-scanned by the movable plate 105 and concurrently V-scanned can be achieved on the screen 122. By using a laser beam as the light beam 121 and performing predetermined intensity modulation related to the timing of optical scanning, a two-dimensional image is formed on the screen 122.

In forming an image, in order to achieve a resolution of SVGA at a frame rate of 60 Hz, if the entire scanning area is an image forming area, there are required 600 scan lines during reciprocating scanning (300 scan lines during only one-way scanning) on the H-scanning side. If the image is rewritten every 60 Hz, the first movable plate 105 is torsionally rotated at a frequency of 18 kHz. Also, during V-scanning, the second movable plate 106 is torsionally rotated at 60 Hz. Therefore, an alternating voltage at 18 kHz is applied to the fixed electrodes 118 and 119 alternately, and an alternating current at 60 Hz is made to flow to the coil 112.

Hereinafter, description will be made of the constituent materials for the optical deflector of this example. The first supporting substrate 102 and the second supporting substrate 103 were each constituted of a p-type silicon substrate having a thickness of 200 μm and a (100) orientation surface that was formed of a thermal oxide film of 0.5 μm. The first movable plate 105, the second movable plate 106, and the torsion springs 107 and 108 were formed by etching the silicon substrate which is the first supporting substrate 102 by means of an inductively coupled plasma reactive ion etching (ICP-RIE) apparatus and then forming through holes therein. The coil 112 was formed by the following process. That is, after Cu was subjected to vacuum evaporation on the outer frame portion of the first supporting substrate 102, a resist mask was provided by a photolithography process, Cu was then patterned to a coil-shaped pattern by means of an ion milling apparatus, and the resist mask was removed.

The insulating layer 115 was obtained by forming an insulating resin film or an insulating thin film on the coil 112 and having the film subjected to the photolithography process and etching. In this example, the insulating layer 115 is formed only on the part of the supporting substrate 102 by applying a polyimide film of 50 μm by spin coating and then having the film subjected to patterning. The hard magnetic films 110 and 111 and the soft magnetic films 116 and 117 having a thickness of 20 μm are formed by electric plating on the second movable plate 106 made of silicon and on the insulating layer 115, respectively. Permalloy was used as the soft magnetic member and Co—P was used as the hard magnetic member. Al was used as the reflecting film 109 and an Al film was formed to have a thickness of 1 μm on the first movable plate 105 by electron-beam evaporation. As the spacer substrate 104, a glass substrate having a thickness of 200 μm was used. The fixed electrodes 118 and 119 and the movable electrode 120 were formed on the second supporting substrate 103 and on the rear surface of the movable plate 105, respectively, by using the same method as that used for forming the coil.

In the optical deflector of this example, the soft magnetic films 116 and 117 were arranged at a predetermined positional relationship in the vicinities of the magnetic poles of the hard magnetic films 110 and 111 on the second movable plate 106. As a result, the magnetic flux generated by the coil 112 efficiently flowed into the vicinity of the magnetic poles so that a large torque was able to be obtained with respect to the second movable plate 106.

In the two-dimensional optical deflector of this example, as to the V-scanning, a low-voltage drive was realized by allowing a current to flow to the coil 112 wound in the periphery. Also, the coil was not arranged on the movable plate, thereby preventing the movable plates from being directly heated by heat generated due to the electrical resistance of the coil. As a result, the frequency variation of the movable plates was able to be avoided.

Further, in the two-dimensional optical deflector of this example, in order to increase magnetism generating force, remanent magnetization of the hard magnetic member may be increased or the thickness of the hard magnetic thin film may be increased. Therefore, since a moment of inertia was proportional to the first power of the weight of the movable plate and to the second power of the distance from the rotation axis of the movable plate, in this example, magnetism generating force was able to be increased only by increasing the mass, which was to be raised to the first power, and the rise of the moment of inertia was able to be thus suppressed. The optical deflector of this example described above had a construction preferable for increasing magnetism generating force and performing high speed scanning by suppressing the rise of the moment of inertia.

EXAMPLE 6

Figure 12A:
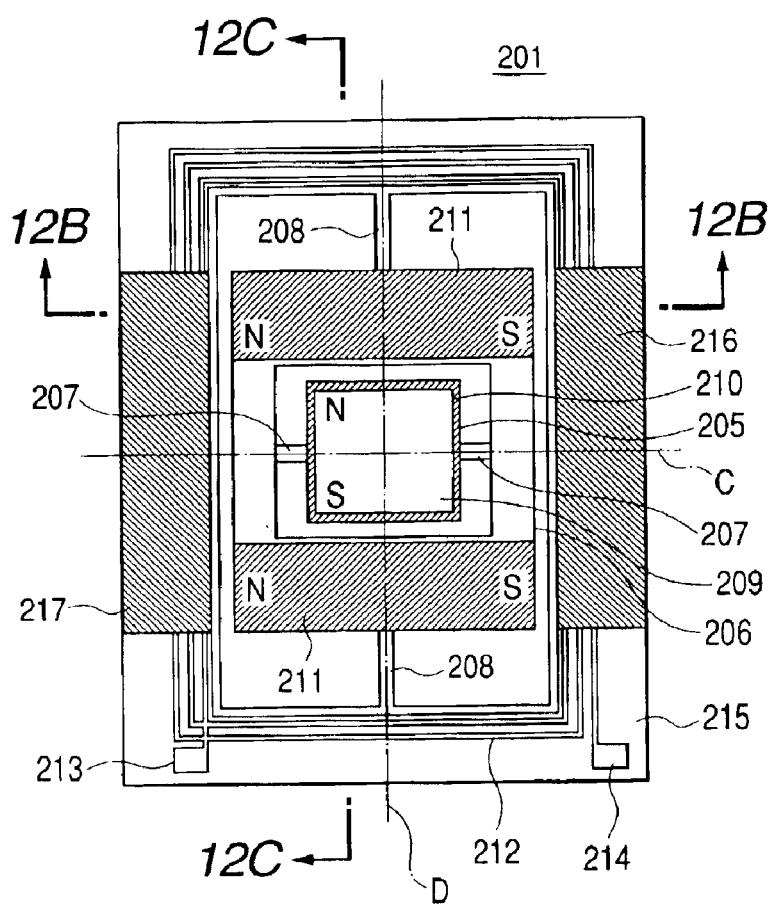
FIGS. 12A, 12B and 12C are views for explaining a two-dimensional optical deflector according to Example 6 of the present invention.
Figure 12C:
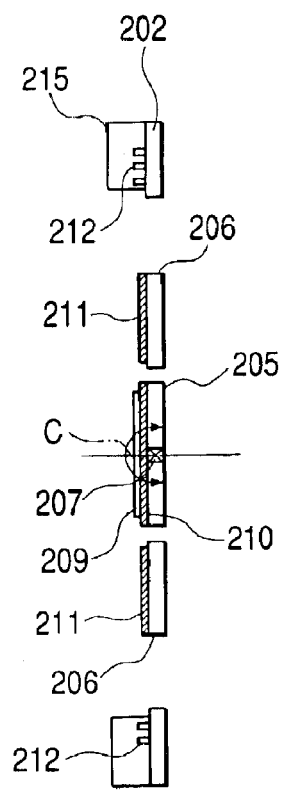
Figure 12B:
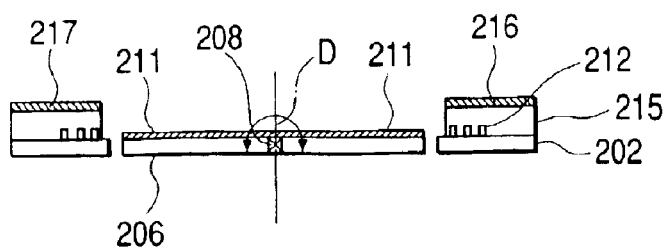
Figure 13:
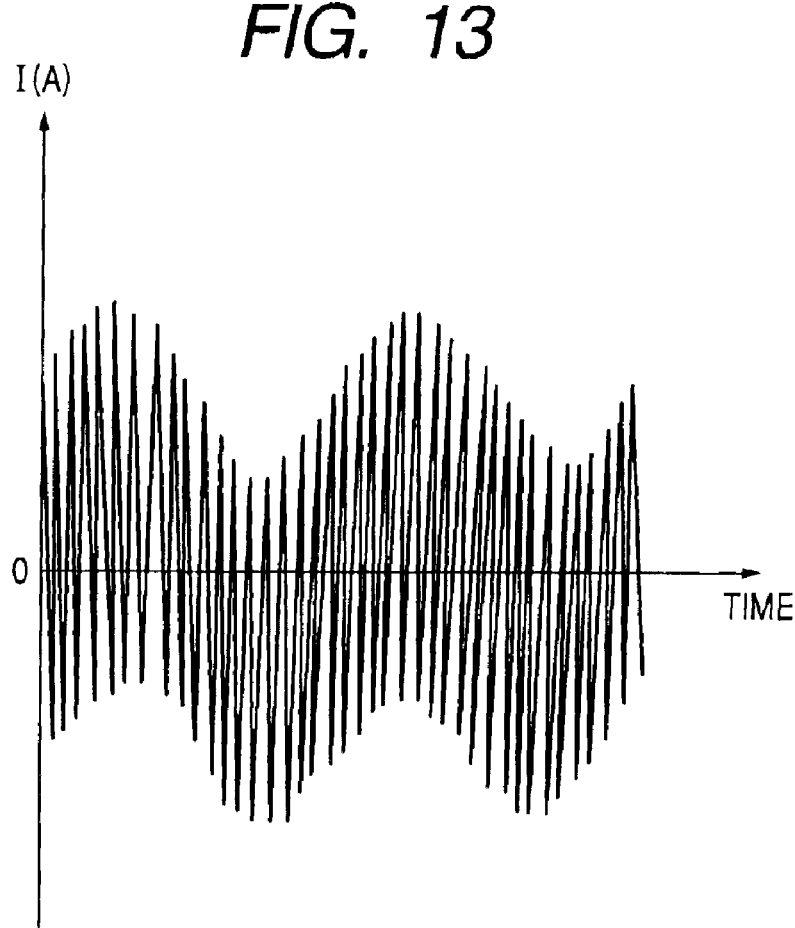
FIG. 13 is a view for explaining a current signal applied to a coil in the case where a light beam is two-dimensionally scanned by using the two-dimensional optical deflector according to Example 6 of the present invention.

FIGS. 12A to 12C show a two-dimensional optical deflector 201 according to Example 6 of the present invention. FIG. 12A is a top view of the optical deflector of this example, FIG. 12B is a sectional view taken along a broken line 12B—12B of FIG. 12A, and FIG. 12C is a sectional view taken along a broken line 12C—12C of FIG. 12A. FIG. 13 shows a current signal applied to a coil 212 in a case where a light beam is two-dimensionally scanned by using the optical deflector of this example, in which ordinate axis indicates the current and abscissa axis indicates the time.

The construction of this example will be described. As shown in FIGS. 12A to 12C, in a frame-shaped first supporting substrate 202, a first movable plate 205 and a second movable plate 206 were elastically supported by a pair of torsion springs 207 and a pair of torsion springs 208, respectively, for free torsional vibration about a rotation axis C and a rotation axis D, respectively. On one surface of the first movable plate 205, there was provided a reflecting surface 209 for reflecting light. Further, a hard magnetic film 210 was arranged over the entirety of one surface of the first movable plate 205 (below the reflecting surface 209). Also, hard magnetic films 211 were arranged on one surface of the second movable plate 206 (at vertically opposite positions as seen in FIG. 12A). The hard magnetic film 210 of the first movable plate 205 was magnetized in the vertical direction as seen in FIG. 12A. On the contrary, the hard magnetic film 211 of the second movable plate 206 was magnetized in the horizontal direction as seen in FIG. 12A.

On the first supporting substrate 202, a coil 212 was wound so as to circle around the movable plates 205 and 206, and pads 213 and 214 were provided on the terminals of the coil 212. An insulating layer 215 was formed on the upper surface of the first supporting substrate 202. On the insulating layer 215, the soft magnetic films 216 and 217 were each arranged so as to face the hard magnetic films 211. Therefore, the magnetic field generated by the current that was made to flow in the coil 212 was exerted on the hard magnetic film 210 formed on the first movable plate 205 as well as the hard magnetic films 211 formed on the second movable plate 206.

Next, according to the operation principle of the optical deflector of this example, the first movable plate 205 and the second movable plate 206 are torsionally rotated by the same method as that used for operating the second movable plate 106 described with reference to FIGS. 10A to 10C and the schematic view of the image display apparatus in FIG. 11. By changing a current to flow to the coil 212, the magnetic field within the coil 212 is varied, and the rotation torque is then generated at the poles of the hard magnetic films 210 and 211 on the first movable plate 205 and the second movable plate 206, thereby torsionally rotating the first movable plate 205 and the second movable plate 206 about the rotation axis C and the rotation axis D, respectively. FIG. 13 shows an example of a driving current made to flow in a coil. In the driving current, the sine wave of a high frequency (fh) is superposed upon the sine wave of a low frequency (fl), whereby each of the first movable plate 205 and the second movable plate 206 can be torsionally rotated around the rotation axis thereof.

In this case, by setting the relationship among a resonant frequency (fr1) of the first movable plate 205, a resonant frequency (fr2) of the second movable plate 206, fh, and fl as shown in the following expression, a crosstalk relating to the displacement between the movable plate 205 and the movable plate 206 can be suppressed to the minimum.

$$fr1 \geq fh > fr2, \ fr2 \geq fl \quad (2)$$

This is because fr2 becomes a mechanical highpass filter and the second movable plate 206 with a low speed cannot perform temporal tracking in the case of the high frequency fh. By applying the above-mentioned alternating current to the coil 212, the image display apparatus shown in FIG. 11 can be constructed using the optical deflector of this example.

In the optical deflector of this example, the soft magnetic films 216 and 217 were arranged in the vicinities of the magnetic poles of the hard magnetic films 211 formed on the second movable plate 206. As a result, the magnetic flux generated by the coil 212 efficiently flowed into the vicinities of the magnetic poles and a large torque was able to be thus obtained. The similar action took place also on parts of the magnetic poles of the hard magnetic film 210 formed on the first movable plate 205 which were close to the soft magnetic films 216 and 217.

Hereinafter, description will be made of the constituent materials for the optical-deflector of this example. The first supporting substrate 202 was constituted of a p-type silicon substrate having a thickness of 200 μm and a (100) orientation surface that was formed of a thermal oxide film of 0.5 μm. The first movable plate 205, the second movable plate 206, and the torsion springs 207 and 208 were formed by etching the first supporting substrate 202 as the same silicon substrate by means of the ICP-RIE apparatus and then forming through holes therein. The coil 212 was formed by the following process. That is, after Cu was subjected to vacuum evaporation, a resist mask was provided by the photolithography process, Cu was then patterned to a coil-shaped pattern by means of the ion milling apparatus, and the resist mask was removed.

The insulating layer 215 was obtained by forming an insulating resin film or an insulating thin film on the coil 212 and having the film subjected to the photolithography process and etching. In this example, the insulating layer 215 was formed only on the part of the supporting substrate 202 which constituted the outer frame, by applying a polyimide film of 50 μm by spin coating and then having the film subjected to patterning. The hard magnetic films 210 and 211 and the soft magnetic films 216 and 217 having a thickness of 20 μm were formed by electric plating on the first movable plate 205 and the second movable plate 206 which were made of silicon and on the insulating layer 215, respectively. Permalloy was used as the soft magnetic member and Co—P was used as the hard magnetic member. As the reflecting film 209, an Al thin film was formed to have a thickness of 1 μm on the hard magnetic film 210 of the first movable plate 205 by electron-beam evaporation.

In the two-dimensional optical deflector of this example as well, as to both V-scanning and H-scanning, a low-voltage drive was realized by allowing a current to flow to the circling coil 212. Also, the coil was not arranged on the movable plate, thereby preventing the movable plates from being directly heated by heat generated due to the electrical resistance of the coil. As a result, the frequency variation of the movable plates 205 and 206 was able to be avoided.

Further, also in the two-dimensional optical deflector of this example, in order to increase magnetism generating force, remanent magnetization of the hard magnetic member may be increased or the thickness of the hard magnetic thin film may be increased. Therefore, since a moment of inertia was proportional to the first power of the weight of the movable plate and to the second power of the distance from the rotation axis of the movable plate, also in this example, magnetism generating force was able to be increased only by increasing the mass, which was to be raised to the first power, and the rise of the moment of inertia can be thus suppressed. The optical deflector of this example described above had a construction preferable for increasing magnetism generating force and for performing high-speed scanning by suppressing the rise of the moment of inertia.

EXAMPLE 7

Figure 14:
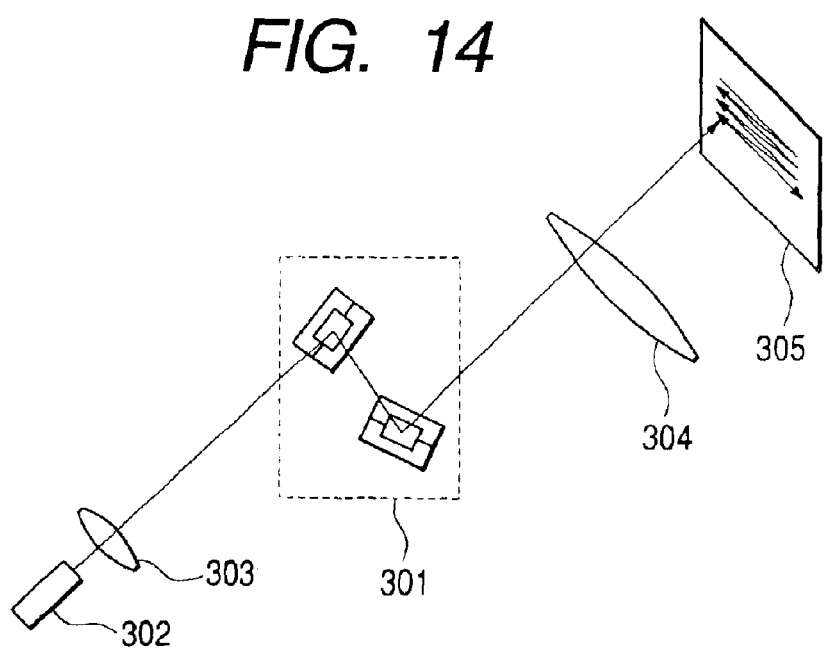
FIG. 14 is a conceptual view of another type of an image display apparatus according to Example 7 of the present invention.

FIG. 14 is a schematic view showing a basic construction of an image display apparatus, which is optical equipment according to Example 7.

In the image display apparatus in FIG. 14, there were provided a group of optical deflectors 301 in which two optical deflectors selected from the optical deflectors described in Examples 1, 2, 3, and 4 were arranged so as to have deflection directions orthogonal to each other. The group of optical deflectors 301 collectively functioned as an optical scanner apparatus for performing raster scanning on an incident light beam in the horizontal and vertical directions. In FIG. 14, reference numeral 302 denotes a laser light source, 303 denotes a lens or a group of lenses, 304 denotes a writing lens or a group of writing lenses, and 305 denotes a projection surface. A laser beam emitted from the laser light source 302 was subjected to predetermined intensity modulation related to the timing of optical scanning, and was two-dimensionally scanned by the group of optical deflectors 301. The scanned laser beam formed an image on the projection surface 305 via the writing lens 304.

Even if the group of optical deflectors 301 is replaced with the two-dimensional optical deflector of Example 5 or 6, a similar image display apparatus can be constructed.

EXAMPLE 8

Figure 15:
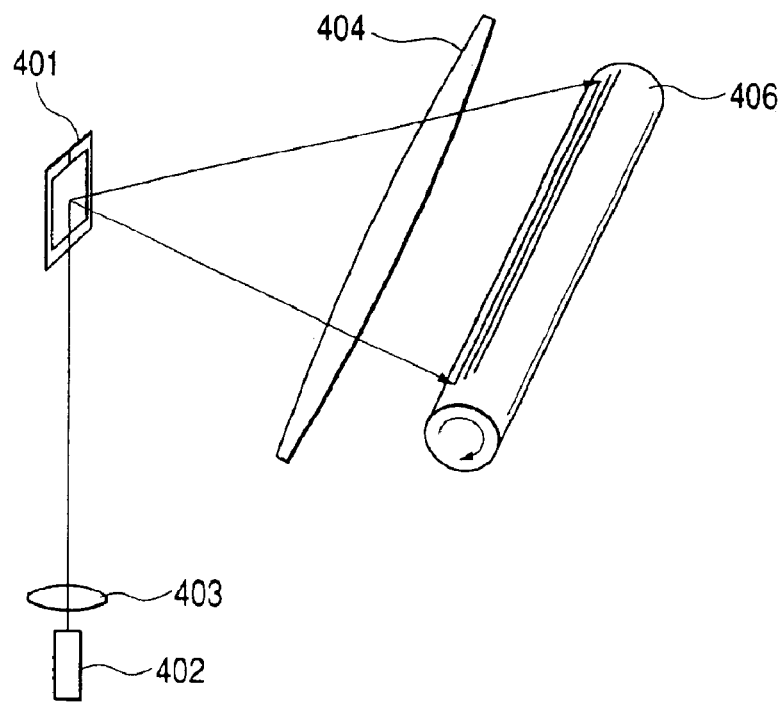
FIG. 15 is a conceptual view of another type of an image display apparatus according to Example 8 of the present invention.
Figure 16:
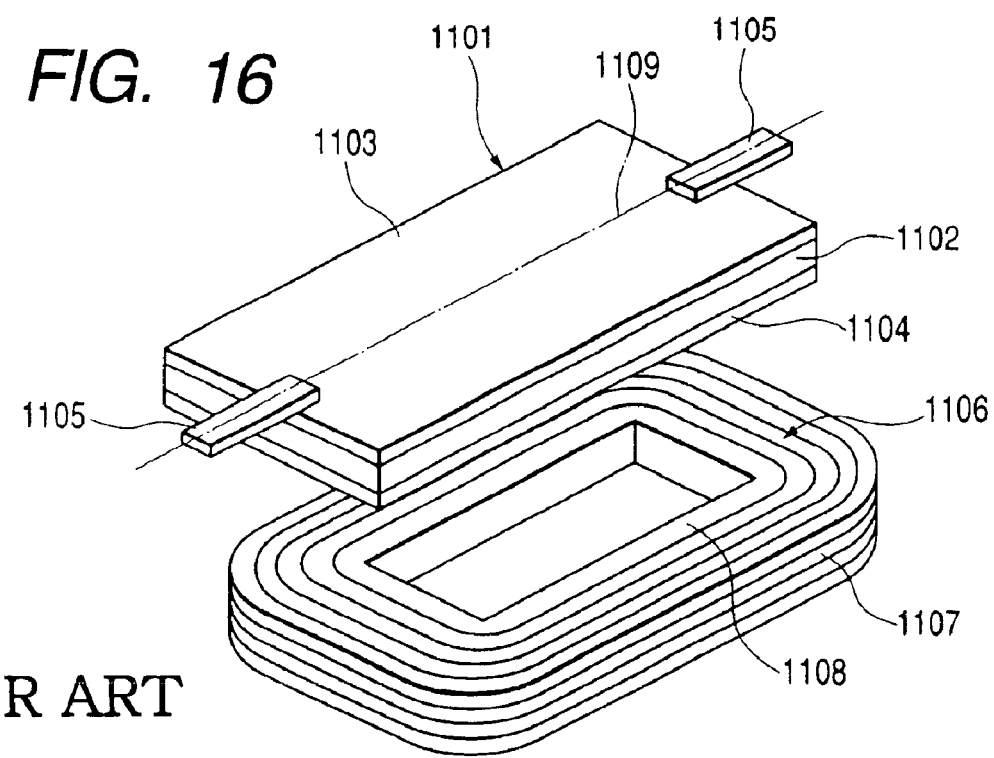
FIG. 16 is a perspective view showing Example 1 of a prior art invention.
Figure 17:
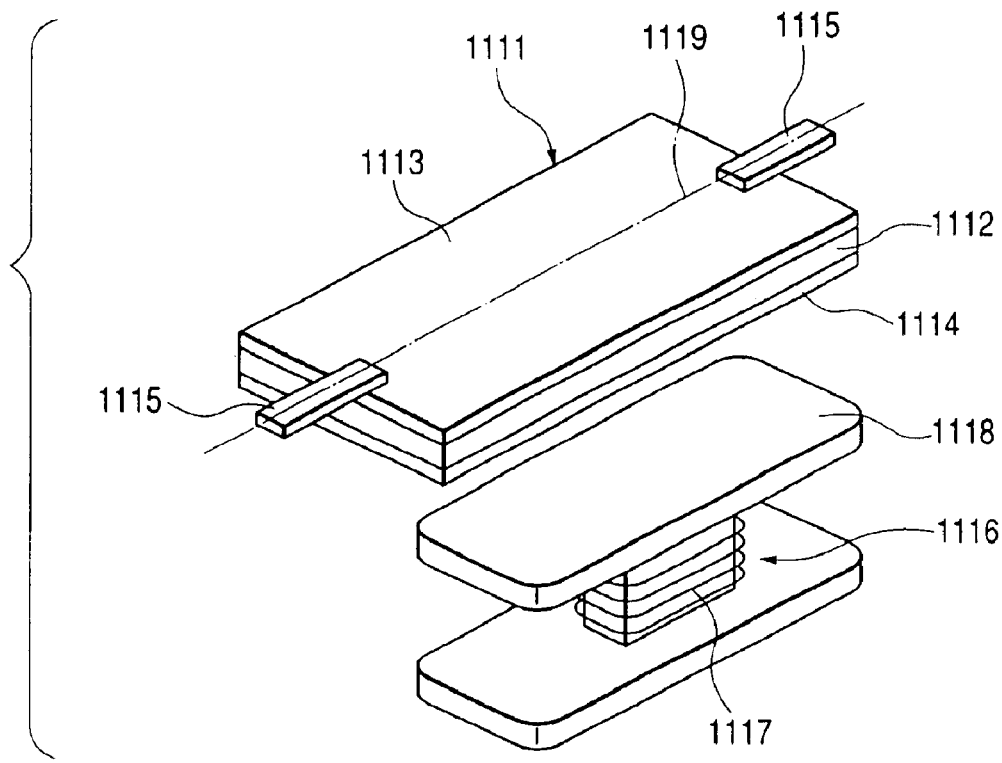
FIG. 17 is a perspective view showing Example 2 of the prior art invention.
Figure 18:
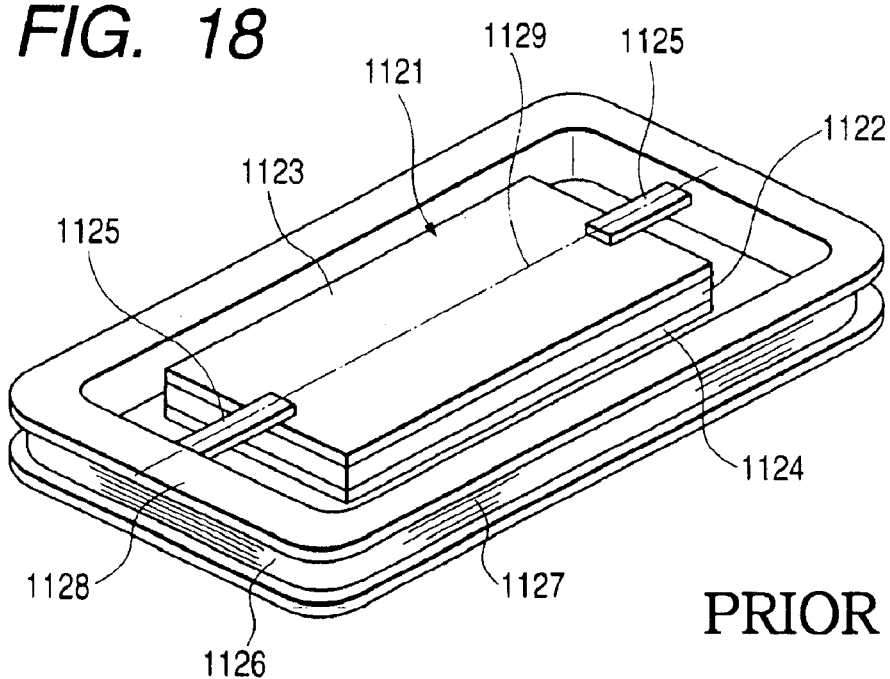
FIG. 18 is a perspective view showing Example 3 of the prior art invention.

FIG. 15 shows a construction of an image display apparatus, which is optical equipment according to Example 8. In FIG. 15, reference numeral 401 denotes the optical deflector according to Example 1, 2, 3, or 4, which in this example functioned as an optical scanner apparatus for one-dimensionally scanning an incident light beam. Reference numeral 402 denotes a laser light source, 403 denotes a lens or a group of lenses, 404 denotes a writing lens or a group of writing lenses, and 406 denotes a photosensitive member. A laser beam emitted from the laser light source 402 was subjected to predetermined intensity modulation related to the timing of optical scanning, and was one-dimensionally scanned by the optical deflector 401. The scanned laser beam formed an image on the photosensitive member 406 via the writing lens 404. The photosensitive member 406 was rotating, so that a two-dimensional image was formed onto the photosensitive member 406.

The photosensitive member 406 was uniformly charged by a charger (not shown). The light beam made incident upon the photosensitive member 406 formed an electrostatic latent image in an area thereof where the light beam was made incident. Then, a toner image was formed in an area corresponding to the electrostatic latent image by a developing device (not shown). By transferring and fixing the toner image to, for example, a sheet, printing was able to be performed.

Even if the optical deflector 401 is replaced with the two-dimensional optical deflector of Example 5 or 6, a similar image display apparatus can be constructed. In this case, it is sufficient that the photosensitive member is made flat and stationary.

As has been described in the above embodiments and examples, according to the present invention, by arranging magnetic generating means such as the plane coil and the soft magnetic member or film in the vicinity of the hard magnetic member or film, the rocking member apparatus such as the optical deflector can be realized which allows a large deflection angle, high speed scanning, and a low power consumption.

What is claimed is:

1. A rocking member apparatus comprising torsion springs, a rocking member axially supported by the torsion spring, and a supporting substrate, the rocking member being rockable about the torsion spring, the apparatus further comprising:

a hard magnetic member provided on one surface of the rocking member;

a coil; and a soft magnetic member, the coil and the soft magnetic member being arranged so as to be spaced apart from the rocking member magnetized in a direction parallel to the one surface, and the coil and the soft magnetic member being arranged at different positions in a direction perpendicular to the one surface, wherein the hard magnetic member and the one surface are arranged at a position which is the same position as the soft magnetic member in a direction perpendicular to the soft magnetic member, or a position which is on the same side of the soft magnetic member as the coil in a direction perpendicular to the soft magnetic member.

2. The rocking member apparatus according to claim 1, wherein the coil is wound to form a spiral on a lower surface of the supporting substrate.

3. The rocking member apparatus according to claim 1, wherein the hard magnetic member, the coil, and the soft magnetic member are arranged in the order of the hard magnetic member, the coil, and the soft magnetic member, in a direction perpendicular to the one surface.

4. The rocking member apparatus according to claim 1, wherein the rocking member is coupled to the supporting substrate with the torsion springs.

5. The rocking member apparatus according to claim 1, wherein the rocking member is coupled through the torsion spring to another rocking member situated outside the rocking member;

the another rocking member situated outside the rocking member is coupled to the supporting substrate with other torsion springs that are different from the torsion springs;

the longitudinal direction of the torsion springs and the longitudinal direction of the other torsion springs intersect each other; and the coil is wounded to form a spiral outside of the rocking member and the other members.

6. The rocking member apparatus according to claim 1, wherein the rocking member is coupled to the supporting substrate with the torsion springs;

another rocking member situated inside the rocking member is coupled to the rocking member with other torsion springs that are different from the torsion springs;

the longitudinal direction of the torsion springs and the longitudinal direction of the other torsion springs intersect each other; and the coil is wound to form a spiral outside of the rocking member and the other members.

7. The rocking member apparatus according to claim 1, further comprising a mirror provided on a surface of the rocking member opposite the one surface.

8. An image display apparatus having as an optical deflector the rocking member apparatus of claim 7.

9. The image display apparatus according to claim 8, wherein the image forming apparatus is an electrographic image forming apparatus.

10. The image display apparatus according to claim 8, wherein the image forming apparatus is a projection image display apparatus.

* * * * *

UNITED STATES PATENT AND TRADEMARK OFFICE
CERTIFICATE OF CORRECTION

PATENT NO. : 6,897,990 B2
DATED : May 24, 2005
INVENTOR(S) : Takayuki Yagi et al.

It is certified that error appears in the above-identified patent and that said Letters Patent is hereby corrected as shown below:

Column 3,
Line 64, "view" should read -- a view --.

Column 9,
Line 25, "and a" should read -- and --.

Column 11,
Lines 24 and 37, "spattering" should read -- sputtering --.

Column 12,
Line 58, "view" should read -- a view --.

Column 15,
Line 52, delete "an".

Signed and Sealed this

Ninth Day of May, 2006

JON W. DUDAS
*Director of the United States Patent and Trademark Office*